United States Patent [19]

Veltri et al.

[11] Patent Number: 4,544,412

[45] Date of Patent: Oct. 1, 1985

[54] DEPOSITION OF IMPROVED SIC COATINGS ON CARBON-BASE MATERIALS

[75] Inventors: Richard D. Veltri, East Hartford; Francis S. Galasso, Manchester, both of Conn.

[73] Assignee: United Technologies Corporation, Hartford, Conn.

[21] Appl. No.: 616,089

[22] Filed: Jun. 1, 1984

Related U.S. Application Data

[62] Division of Ser. No. 391,613, Jun. 24, 1982, Pat. No. 4,476,164.

[51] Int. Cl.$^4$ ................................................ C09D 1/00
[52] U.S. Cl. ..................................... 106/286.5; 501/88
[58] Field of Search ........................ 106/286.5; 501/88

[56] References Cited

U.S. PATENT DOCUMENTS 4,465,777  8/1984  Shuford ................................. 501/88
4,476,164  10/1984  Veltri ................................. 427/249

*Primary Examiner*—Theodore Morris
*Attorney, Agent, or Firm*—Charles E. Sohl

[57] ABSTRACT

Carbon-carbon composite materials are provided with significantly enhanced oxidation resistance by the formation of a SiC coating. The coating is produced from a pack containing a small but effective amount of boron. The balance of the pack is preferably based on $Al_2O_3$, $SiO_2$, and Si. The composite to be coated is embedded in the pack and heated to an elevated temperature. The boron addition provides a conversion SiC coating having enhanced resistance to oxidation.

1 Claim, No Drawings

DEPOSITION OF IMPROVED SIC COATINGS ON CARBON-BASE MATERIALS

This is a division of application Ser. No. 391,613, filed on June 24, 1982, now U.S. Pat. No. 4,476,164.

DESCRIPTION

1. Technical Field

This invention concerns SiC base conversion coatings for carbon-base materials, and to methods for producing such coatings.

2. Background Art

Carbon-carbon composites are a class of unique materials whose properties, especially at elevated temperatures, make them attractive for various aerospace applications. The materials are composites although all of the composite elements are comprised essentially of carbon, in its various allotropic forms. Carbon-carbon materials are produced starting with organic precursor fibers such as polyacrylonitrile, rayon or pitch. Such fibers are usually produced in bundles (yarn), often by an extrusion process. The precursor fibers are heated in an inert atmosphere to pyrolyze or carbonize them and may then be heated to a higher temperature (e.g. 4000° F., 2204° C.) to form graphite fibers. These carbon or graphite materials may then be laid down, woven, or interleaved to form what are referred to as 1D, 2D, 3D, etc. structures where D stands for direction (i.e. in a 2D structure, fibers are laid in two, usually orthogonal directions).

These woven structures can then be impregnated with a pitch or resin material which is converted to carbon and then graphite. In this process, hot pressing is also employed to obtain a dense structure. Repeated impregnation steps can be employed to increase density. An alternative processing scheme is to use chemical vapor deposition (CVD) to deposit pyrolytic graphite matrix.

The finished product is 90+% carbon but by virtue of the fiber alignment and other processing details such as densification, has exceptional mechanical properties when compared with other carbon type materials. The mechanical properties are constant, or even increase slightly, with temperatures up to about 4000° F. (2204° C.). This temperature capability makes carbon-carbon materials exceptionally attractive for various aerospace applications including gas turbine engines. The obvious drawback is the susceptibility of carbon-carbon materials to oxidation. The present invention concerns a coating to protect carbon-carbon materials from catastrophic oxidation at temperatures up to at least 2500° F. (1371° C.).

It is known in the prior art to use SiC conversion coatings to protect carbon-base materials, including carbon-carbon composites. Such coatings are conversion coatings because the surface of the article to be coated is converted to SiC by reacting it with silicon. Pack coating processes are popular. A carbon article can be embedded and heated in a pack material which will produce Si or Si compound vapors when heated. Specifically, pack compositions based on $Al_2O_3$, Si and $SiO_2$ are known.

It is also known in the art to use additions of boron compounds and boron throughout the matrix of carbon-base materials to reduce oxidation susceptibility. This is revealed in U.S. Pat. Nos. 2,992,960; 3,374,102; 3,672,936; and 4,119,189 as well as in The Society for the Advancement of Material and Process Engineering (SAMPE) Conference Proceedings, 1976, Vol. 8, pp. 308-337 by D. C. Rogers et, al.

U.S. Pat. No. 3,936,574 describes a slurry coating process employing a slurry containing 10-35% B for protecting carbon base materials.

A duplex pack coating process employing a first pack of 100% B and a second pack containing Zr and Si is described in SAMPE Conference Proceedings, 1976, Vol. 8, pp. 308-337 by D. C. Rogers et al.

The basic concept of pack derived coatings to protect carbon-base materials appears in U.S. Pat. No. 3,095,316 and in the SAMPE Conference Proceedings, 1975, Vol. 7, pp. 319-336 by D. C. Rogers et al.

It is an object of this invention to describe a method for producing an improved pack derived coating on carbon-base materials, specifically on carbon-carbon materials.

DISCLOSURE OF INVENTION

A powdered pack material (which produces Si and/or Si compound vapors) used to produce SiC conversion coatings on carbon-carbon materials produces SiC coatings with enhanced performance when 0.1%-3.0% B is added to the pack. A pack based on SiC, Si, and $Al_2O_3$ and nominally containing 60% SiC, 30% Si, 9% $Al_2O_3$ and 1% boron can produce such an enhanced coating on a carbon-carbon article embedded in the pack when the combination is heated to a temperature of 1600°-1800° C. for 1-8 hours in an inert atmosphere.

The foregoing, and other features and advantages of the present invention, will become more apparent from the following description.

BEST MODE FOR CARRYING OUT THE INVENTION

Carbon-carbon composite materials are provided with an improved conversion silicon carbide coating through the use of a pack coating technique in which a small amount of boron is added to the coating pack. It has been known in the prior art to protect carbon-based materials including carbon-carbon composite materials by developing a silicon carbide conversion coating on the surface of the article to be protected using pack techniques. For example, a pack containing mixed powders of the approximate composition (by weight): 10% $Al_2O_3$, 60% SiC, and 30% Si may be used to produce a silicon carbide conversion coating to the surface of a carbon-base material by surrounding the article to be coated with the pack material and heating it at approximately 1700° C. for a time on the order of five hours. During this treatment, Si from the pack material diffuses into the carbon-carbon material to form a silicon carbide coating which extends inward from the article surface approximately 1-10 mils, depending upon the characteristics of the carbon-based material and exact coating process parameters. Such silicon carbide conversion coatings find application in protecting the carbon surface from oxidation at elevated temperatures. The silicon carbide coating can be used alone to protect the surface from moderate oxidizing conditions or can be used as a base or foundation layer upon which further layers of protective coatings are applied in order to provide protection to the carbon surface under extremes of temperatures for extended periods of time.

We have found that the protective character of the pack derived silicon carbide coating can be substantially and unexpectedly improved if a small amount of boron is included in the pack material from which the coating is generated. From about 0.1 to 3% boron may be included in the previously described pack. Preferably the boron level is in the range of 0.2 to 1.5%. Lesser boron levels do not provide the desired protective characteristics while boron levels much in excess of about 1% lead to sintering of the pack material to the article being coated rendering its subsequent removal difficult. Nonetheless the broad ranges of boron additions may well be useful in situations where the pack ingredients are altered in species or amount. The beneficial results of boron additions will be illustrated in the following example. Table 1 lists the constituents of two pack compositions which were used to apply protective silicon carbide conversion coatings to the surface of a carbon-carbon composite material.

TABLE 1

|  | With Boron % | Without Boron % | Mesh Size* | Broad Range % |
|---|---|---|---|---|
| $Al_2O_3$ | 9 | 10 | −325 | Balance |
| SiC | 60 | 60 | −400 | 50−70 |
| Si | 30 | 30 | −200 | 25−35 |
| B | 1 | — | −325 | .2−3 |

*US Std Sieve

This pack material was mixed and placed in a graphite crucible. The article to be coated was buried in the pack material and the crucible was covered with a tightly fitting graphite cover. The covered crucible was placed in a furnace with an argon atmosphere and heated to a temperature of 1680° C. for about five hours. This produced a conversion coating having a depth of about 4 mils. The coated articles were then overcoated with a thin layer of chemically vapor deposited (CVD) $Si_3N_4$ having a thickness of about 3 mils. These samples were then evaluated by oxidation testing at 2000° F. in a furnace with an air atmosphere. The samples were periodically removed (about every 10 hours) and evaluated for coating performance by monitoring weight change. The sample which had been coated in the pack which did not contain boron lost about 10% of its total weight in the first 20 hours of testing and testing was terminated. The sample which had been conversion coated in the boron containing pack displayed a weight gain of about 0.03% in 200 hours of testing. This weight gain is within the experimental accuracy of the measurements involved and it can therefore be said that the boron containing conversion coating was completely effective in protecting the carbon-carbon composite from oxidation at 2000° F. for 200 hours of testing.

The role of the boron in providing the observed benefits is not well understood. Two possibilities will be mentioned. The first is that the boron has diffused into the carbon-carbon material and thereby given it some intrinsic resistance to oxidation. The second possibility is that the effect of the boron is merely to provide a more uniform and dense silicon carbide coating by promoting sintering of the pack material and thus providing close contact with the pack material with the carbon-carbon composite. We believe that the boron does enter into the pack coating and in some fashion increases the inherent oxidation resistance of the coating itself, perhaps through formation of boron-carbon compounds.

As noted, the $Al_2O_3$, SiC and Si pack ingredients and proportions are known in the art. Boron has been shown to improve the properties of SiC conversion coatings produced by this pack and $Al_2O_3$ - SiC - Si packs are preferred. It should be apparent that other pack compositions, which produce free Si/SiC vapors under deposition conditions, will also likely benefit from the addition of boron. In like manner, only elemental B has been studies but suitable boron containing compounds such as $B_4C$ will also produce the desired result—the essential feature is that the boron containing compound dissociates under the coating conditions employed so that elemental boron is available, and that the other compound constituents have no adverse effect on the pack coating process.

It should be understood that the invention is not limited to the particular embodiments shown and described herein, but that various changes and modifications may be made without departing from the spirit and scope of this novel concept as defined by the following claims.

We claim:

1. An improved pack material for the formation of SiC coatings on carbon-base materials consisting essentially of about:
   about 60% SiC powder,
   about 30% Si powder,
   about 1% B powder,
   about 9% $Al_2O_3$ powder.

* * * * *